United States Patent Office 3,257,393
Patented June 21, 1966

3,257,393
SUBSTANTIVE, WATER-SOLUBLE METHINE DYES
William Howells Vinton, Hockessin, Del., assignor to
E. I. du Pont de Nemours and Company, Wilmington,
Del., a corporation of Delaware
No Drawing. Filed Aug. 20, 1962, Ser. No. 218,147
7 Claims. (Cl. 260—240.9)

The present invention is directed to novel methine dyes that are partly or almost completely substantive to cellulosic fibers and, accordingly, are particularly useful for coloring paper or paper pulp with or without the use of rosin size and alum to afford colored paper.

It is an object of the present invention to provide novel yellow dyes that are superior in strength and brightness to any known yellow dyes for paper. A further object is to provide such dyes which effect considerable economy with respect to manufacture and, in some instances, with respect to the high degree with which the dyes are exhausted onto paper from the extreme dilutions commonly used in paper making machines. Other objects are to provide dyes that are compatible with numerous anionic dyes and additives used in paper manufacture. Also, this invention provides dyes which, in admixture with blue paper dyes, provide strong and bright green shades.

These and other objects are achieved by condensing selected dye intermediates by a variety of synthetic routes as illustrated in the examples which follow. Considering the three main starting materials for my novel methine dyes;

A. A p-aminobenzaldehyde compound which contains at least one sulfoalkyl group attached to nitrogen, or a group capable of being converted to same,
B. An alkyl cyanoacetate, and
C. A selected aminoarylsulfonic acid, one may condense these reactants according to the following general schemes:

(I)    $A+B \rightarrow AB$, then $AB+C \rightarrow ABC$, and
(II)   $B+C \rightarrow BC$, then $BC+A \rightarrow ABC$ When compound A is a p-[(sulfoalkyl)amino]benzaldehyde, routes I and II are two-step routes as illustrated. In this case the compound ABC contains at least one sulfo group in each of its A and C components.

In the event that compound A does not contain a water-solubilizing N-(mono or bis) sulfoalkyl group, which is required in the final dye, but instead contains a halogenoalkyl group capable of being readily converted to said sulfoalkyl group, the sulfonation reaction may be performed at any convenient stage of the above outlined routes. In this case the replacement sulfonation (conversion of halogenoalkyl to sulfoalkyl) is performed on a compound of type AB or ABC.

More specifically, the present invention is directed to a novel compound of the formula

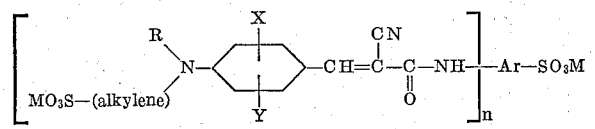

wherein Ar—SO₃M is a radical selected from the group consisting of

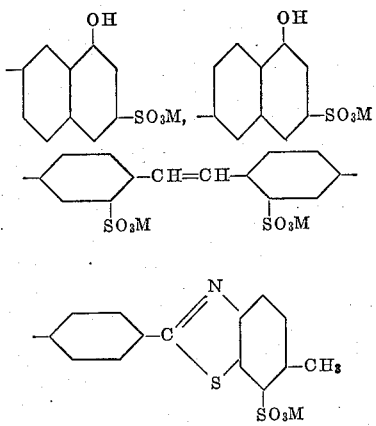

and alkylene is a straight or branched aliphatic hydrocarbon chain containing 2 to 4 carbon atoms on which the sulfo group is located at a carbon atom numbered 2 to 4, $n$ in an integer from 1 to 2 as required by the valence of said aryl radicals; R is selected from the group of radicals consisting of alkyl, benzyl, phenethyl, 2-hydroxyethyl, 2-cyanoethyl, 2-chloroethyl, 2-bromoethyl, alkoxymethyl, 2-alkoxyethyl, 2-(2-hydroxyethoxy)ethyl and —(alkylene)—SO₃M; X and Y may be alike or different and are selected from the group of radicals consisting of hydrogen, alkyl, alkoxy, fluorine, chlorine and bromine, wherein said alkyl and alkoxy radicals have from 1 to 4 carbon atoms, and M is selected from the group consisting of hydrogen, an alkali metal, an alkaline earth metal and the ammonium radical.

Representative examples illustrating the present invention follow.

PART I.—SULFO-ALDEHYDES

Example 1

(A) To an agitated solution of 450 parts of N-(2-chloroethyl)-N-ethylaniline (prepared by treating N-ethyl-N-(2-hydroxyethyl)aniline with POCl₃) in 500 parts of chlorobenzene, there are added 180 parts of N,N-dimethylformamide and 395 parts of phosphorus oxychloride during a four-hour period while maintaining the reaction mixture at 5° to 10° C. After stirring for 12 hours at room temperature, the mixture is heated to 65° C. and stirred at this temperature for one hour. The reaction mass is then poured into 1000 parts of ice, and the resulting aqueous solution is neutralized with 30% sodium hydroxide solution. The organic phase is separated, dried over anhydrous sodium sulfate, and stripped of chlorobenzene by vacuum distillation. The residual oil is the desired p-[(2-chloroethyl)-ethylamino]benzaldehyde. Analyses of the aldehyde thus obtained agree very closely with the values for C, H, N and Cl required by the empirical formula: $C_{11}H_{14}ONCl$.

(B) 575 parts of the aldehyde prepared in part (A) of the present example are suspended in a solution of 356 parts of sodium sulfite in 1400 parts of water. The agitated suspension is heated at 190° C. in a closed autoclave for 30 minutes. The resulting solution is stirred with 15 parts of carbon black, filtered, and the filtrate is evaporated to dryness to yield a tan-colored hygroscopic powder which is the desired product, p-[ethyl(2-sulfoethyl)amino]benzaldehyde, sodium salt, in admixture with some sodium chloride. By extracting the tan solid with boiling N,N-dimethylacetamide, the aldehyde is separated from the salt. The purified aldehyde is precipitated from the cooled extract with ether, and is filtered off and dried. The aldehyde thus obtained has for formula:

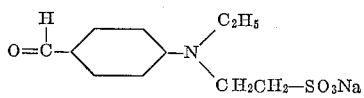

Oximation of the purified aldehyde with hydroxylamine hydrochloride, followed by titration of the released HCl with standard alkali by well known methods, confirms the presence of free aldehyde group in theoretical proportions.

*Example 2*

(A) Following the procedure of Example 1(A), N-(2-chloroethyl)-N-methylaniline (prepared by treating N-(2-hydroxyethyl)-N-methylaniline with $POCl_3$) is converted to p-[(2-chloroethyl)methylamino]benzaldehyde.

(B) The aldehyde prepared in part (A) of the present example is heated with one equivalent of sodium sulfite in aqueous medium in an autoclave at 190° C. for 30 minutes as described in Example 1(B). The product, p-[methyl(2-sulfoethyl)amino]benzaldehyde, sodium salt is isolated by drying the reaction mass. The aldehyde, mixed with sodium chloride formed in the reaction, is a tan-colored, taffy-like solid. By extracting the tan solid with boiling N,N-dimethylacetamide, the aldehyde is separated from the salt. The purified aldehyde is precipitated from the cooled extract with ether, and is filtered off and dried. Oximation of the white solid thus obtained (see Example 1(B)) shows the aldehyde group to be present in essentially theoretical amount.

*Example 3*

(A) To an agitated solution of 181 parts of 2,2'-(phenylimino)diethanol in 300 parts of chlorobenzene there is added 368 parts of phosphorus oxychloride at 25° to 45° C. After heating the mixture at 90° C. for two hours, it is cooled to 5° C. at which temperature 148 parts of N,N-dimethylformamide are added. Additional phosphorus oxychloride is added, 161 parts, and the reaction mixture is agitated at 8° to 10° C. for two hours. It is then warmed to 60° C., agitated for one hour at 60° C., and poured into 1000 parts of ice. The aqueous mixture is neutralized and then made slightly alkaline to Brilliant Yellow test paper with concentrated ammonia at 0° C. The alkaline mixture is filtered, and the organic layer is separated and steam distilled to remove chlorobenzene. The white solid, which separates upon stirring the residue, is filtered off, washed with water, and dried. It is p-[bis(2-chloroethyl)amino]benzaldehyde.

(B) 123 parts of the aldehyde thus prepared, 500 parts of water and 126 parts of sodium sulfite are heated at 90° C. for one hour in a closed autoclave. The resulting solution is stirred with 5 parts of carbon black, filtered and the filtrate is evaporated to yield a light yellow powder which consists of p-[bis(2-sulfoethyl)amino]benzaldehyde, disodium salt in admixture with sodium chloride. According to analysis by oximation, as described in Example 1(B), the product mixture contains 41.8% by weight of the aldehyde compound.

*Example 4*

(A) A mixture consisting of 198 parts of N-(4-chlorobutyl)-N-methylaniline (made by condensing 1-bromo-4-chlorobutane with N-methylaniline), 500 parts of chlorobenzene, 73 parts of N,N-dimethylformamide and 161 parts of phosphorus oxychloride is heated, to provide p-[(4-chlorobutyl)methylamino]benzaldehyde, following the method described in Example 1(A).

(B) An agitated mixture of 226 parts of the aldehyde thus obtained, 500 parts of water and 126 parts of sodium sulfite is heated at 190° C. for 90 minutes under nitrogen in a closed autoclave. The resulting solution is stirred with five parts of carbon black, filtered and evaporated to dryness. The product thus obtained contains about 16% by weight of sodium chloride along with the sodium salt of the sulfonic acid. It is purified by extracting with N,N-dimethylacetamide and precipitating with a 10-fold volume of acetone. It is highly water soluble and has the structure

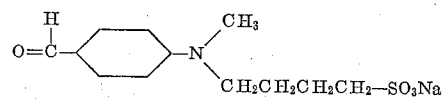

p-[methyl(4-sulfobutyl)amino]benzaldehyde, sodium salt.

PART II.—METHINE DYES

*Example 5*

(A) A solution consisting of 279 parts of the sulfoaldehyde prepared in Example 1(B), 1000 parts of N,N-dimethylacetamide, 120 parts of ethyl cyanoacetate and three parts of piperidine is heated at refluxing temperature for three hours. The yellow reaction mass is then drowned in 10 times its volume of isopropyl alcohol, cooled and filtered. The bright yellow hygroscopic solid is the sodium salt of α-cyano-4-[ethyl(2-sulfoethyl)amino]cinnamic acid, ethyl ester. It shows strong absorption at 428 millimicrons in water solution and at 419 millimicrons in methanol, and dyes fibers such as nylon, wool and silk, containing basic sites, from a hot, acidic, aqueous dyebath in strong green-yellow shades.

(B) 374 parts of the ester thus prepared, 342 parts of 2-(p-aminophenyl)-6-methyl-7-benzothiazolesulfonic acid, sodium salt and 3000 parts of N,N-dimethylacetamide are heated together at reflux temperature for two hours. The ethanol by-product is allowed to distill off through a fractionation still. The hot reaction mass is filtered and the filtrate is added slowly to a ten-fold volume of isopropyl alcohol. The yellow precipitate is filtered off, washed with acetone, and dried. An aqueous solution of the yellow paper-substantive methine dye thus obtained exhibits an absorption maximum at 439 millimicrons, and from methanol solution a peak at 419 millimicrons. The yellow dye has the formula:

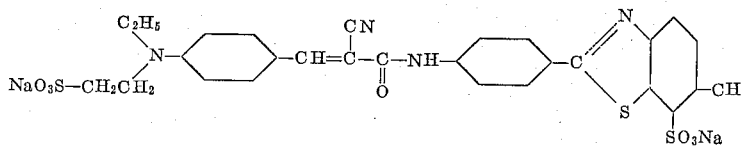

*Example 6*

(A) A solution of 246 parts of p-[bis(2-chloroethyl)amino]benzaldehyde (Example 3(A)), 120 parts of ethyl cyanoacetate, 500 parts of ethanol and three parts of piperidine is heated at reflux temperature for four hours. After cooling the reaction mass in an ice bath, a yellow solid is filtered off, washed with cold ethanol, and dried. It is 4-[bis(2-chloroethyl)amino]-α-cyanocinnamic acid, ethyl ester.

(B) A solution of 341 parts of the ester thus prepared, 342 parts of 2-(p-aminophenyl)-6-methyl-7-benzothiazolesulfonic acid, sodium salt, and 2000 parts of N,N-dimethylformamide is heated and refluxed for four hours, during which time about 45 parts of ethanol are removed by fractional distillation. The solution is cooled and drowned in a 10-fold volume of ether to precipitate a yellow compound which is filtered off, washed with acetone and dried. It has the formula:

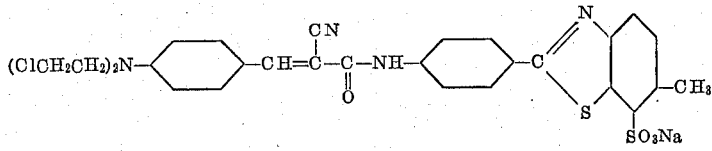

(C) A suspension of 637 parts of the amide, thus obtained, in 1000 parts of water containing 252 parts of sodium sulfite is agitated and heated in an autoclave at 160° C. for four hours. The resulting product is completely soluble and, after filtering off traces of by-product, is isolated by quickly drying the solution on a heated drum. The yellow paper dye thus obtained has the formula:

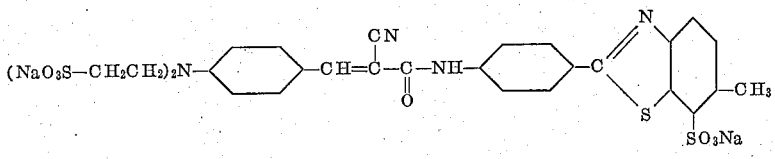

It exhibits an absorption maximum in water solution at 414 millimicrons, and in methanol solution at 394 millimicrons.

Example 7

(A) 170 parts of 4 - [bis(2 - chloroethyl)amino]-α-cyanocinnamic acid, ethyl ester (Example 6(A)), are suspended in a solution of 126 parts of sodium sulfite in 500 parts of water. The mixture is stirred and heated at 150° to 160° C. for four hours in an autoclave. The resulting solution is evaporated to dryness to afford 4-[bis(2 - sulfoethyl)amino]-α-cyanocinnamic acid, ethyl ester in admixture with the sodium chloride which forms during the reaction. The ester is separated from the salt and purified by the method described in Example 1(B).

(B) An agitated mixture consisting of 471 parts of the ester thus obtained, 342 parts of 2-(p-aminophenyl)-6-methyl-7-benzothiazolesulfonic acid, sodium salt and 5000 parts of N,N-dimethylacetamide is heated at reflux temperature for two hours. During this time, the ethanol by-product is removed by fractional distillation. The reaction mass in solution, is slowly drowned into 50,000 parts of acetone with good agitation. The precipitate is filtered off and dried to afford a yellow-orange powder having the same structure as that shown for the dye prepared in Example 6(C). It exhibits an absorption maximum in water solution at 414 millimicrons, and in methanol solution at 394 millimicrons. The dye dissolves readily in water to provide a solution which contains over 5% dye by weight.

Example 8

(A) 51 parts of the sodium salt of 6-amino-1-naphthol-3-sulfonic acid (J acid) are heated in 95 parts of N,N-dimethylacetamide to distill off any residual water that may be present. 24 parts of ethyl cyanoacetate are added and the reaction mass is heated to effect gentle boiling over a period of 2.5 hours. Ethanol is collected from the reaction mass by means of a fractionating column. At the end of the reaction period a small amount of the solvent distills off. The mass is then cooled and sufficient ether is added to effect phase separation. The dark lower layer is separated and dissolved in 150 parts of ethanol. This solution is treated with sufficient ether to effect phase separation again. The lower phase is separated and allowed to stand. After about 0.5 hour, crystals form in the separated phase and stirring leads to rapid crystallization of the entire mass. The product thus obtained is 6-(cyanoacetamido)-1-naphthol-3-sulfonic acid, sodium salt.

(B) An agitated mixture consisting of 164 parts of the cyanoacetamido compound thus obtained, 148 parts of p - [bis(2 - chloroethyl)amino]benzaldehyde (Example 3(A)), 10 parts of piperidine and 4000 parts of ethanol are heated at reflux temperature for 12 hours. The reaction mass is cooled and filtered. The yellow precipitate is washed with acetone, and dried. This product exhibits a spectral maximum in water solution at 418 millimicrons, and in methanol solution at 403 millimicrons.

(C) 278 parts of the methine-amido compound prepared in part (B) of the present example, 126 parts of anhydrous sodium sulfite and 500 parts of water are stirred and heated in a closed autoclave, under nitrogen gas, at 190° C. for one hour. After cooling the resulting solution to 70° C., it is stirred with five parts of decolorizing carbon black, filtered, and the filtrate is evaporated to dryness. An excellent yield of dye containing about 15% by weight of sodium chloride is obtained. The dye can be used as is for dyeing paper, or it can be purified by recrystallization from an N,N-dimethylacetamide-acetone solvent pair. An aqueous solution of the dye has a strong absorption maximum at 418 millimicrons, and in methanol solution at 390 millimicrons. It has the structure

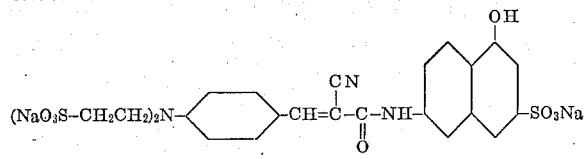

and dissolves readily in water to provide a solution which contains over 5% dye by weight.

Example 9

(A) A mixture of 68.4 parts of 2-(p-aminophenyl)-6-methyl-7-benzothiazolesulfonic acid, sodium salt (sulfodehydrothio-p-toluidine) and 141.5 parts of N,N-dimethylacetamide is heated to remove residual water by distillation. 24.9 parts of ethyl cyanoacetate are added to the mixture which is then agitated at 161° to 171° C. while ethanol is fractionally distilled from the reaction mass. After heating in this manner for about two hours the mass is cooled to room temperature. The precipitated reaction product is filtered off, washed with 70 parts of N,N-dimethylacetamide, and dried. An excellent yield of 2 - [p - (cyanoacetamido) - phenyl] - 6 - methyl - 7- benzothiazolesulfonic acid, sodium salt is obtained. It has the structure:

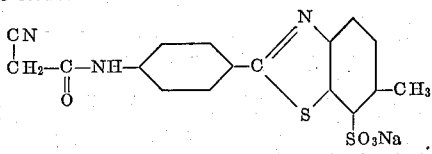

(B) 205 parts of the product thus obtained, 140 parts of p-[ethyl(2-sulfoethyl)amino]benzaldehyde, sodium salt, Example 1(B)), 5000 parts of isopropyl alcohol and 20 parts of piperidine are agitated and heated at the reflux temperature for 12 hours. A strong yellow-orange colored reaction mass develops. The mass is cooled in ice and the precipitated dye is filtered off and washed in turn with isopropyl alcohol and hot acetone. The dried dye dissolves in water to the extent of over 2% by weight of the solution. The dye has the same structure as that shown for the dye prepared in Example 5(B).

When the salt-aldehyde mixture (260 parts), as prepared in Example 1(B), is used in this example in lieu of 140 parts of the purified aldehyde, one obtains the same final dye but contaminated with sodium chloride. This product can be used as such for dyeing paper or it can be extracted with boiling N,N-dimethylacetamide and the extract treated with 10 volumes of isopropyl alcohol to precipitate the analytically pure dye which is filtered off. The dye, so purified has a strong absorption peak, in water solution, at 439 millimicrons, and at 419 millimicrons in methanol. The dye is further characterized by excellent brightness and its outstanding resistance to shade change when applied to paper in the presence of size and alum.

Example 10

An agitated mixture of 164 parts of 6-(cyanoacetamido)-1-naphthol-3-sulfonic acid sodium salt (Example 8(A)), 260 parts of p-[ethyl(2-sulfoethyl)amino]benzaldehyde, sodium salt (Example 1(B)), 2400 parts of ethanol and 5 parts of piperidine is heated at reflux temperature for 12 hours. The reaction mass is cooled in an ice bath and the precipitated dye is filtered off. The filter cake is washed with cold ethanol, then with hot acetone, and is dried. The dye is admixed with some sodium chloride; however, it can be used as such to dye paper or it can be purified by extracting with boiling N,N-dimethylacetamide and diluting the extract with 10 volumes of acetone to precipitate the pure dye which is filtered off. The dye dissolves in water to the extent of over 2% by weight of solution. In water solution it shows a strong absorption peak at 430 millimicrons, and at 406 millimicrons in methanol solution.

Example 11

(A) 65 parts of ethyl cyanoacetate are added to a stirred suspension of 110 parts of 7-amino-1-naphthol-3-sulfonic acid, sodium salt (gamma acid) in 1000 parts of N,N-dimethylacetamide. The mixture is heated so that a temperature of 172° C. is reached in a period of two hours. During this period, distillate (chiefly ethanol) is removed from the reaction mass through a fractionating column. The mass is cooled and then added to a 10-fold volume of isopropyl alcohol in which the reaction product precipitates as a tan granular material. The precipitate is filtered off, washed with isopropyl alcohol, and dried. An excellent yield of 7-(cyanoacetamido)-1-naphthol-3-sulfonic acid, sodium salt is obtained. It has the structure

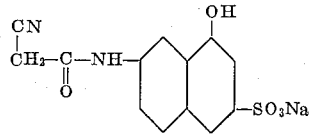

(B) 165 parts of the product thus obtained, 260 parts of the tan powder of Example 1(B) which is a mixture of sodium chloride and p-[ethyl(2-sulfoethyl)amino]benzaldehyde, sodium salt, 4000 parts of ethanol and 10 parts of 20% aqueous potassium hydroxide solution are agitated and heated at reflux temperature for 12 hours. The mixture is cooled in ice and filtered. The precipitate is washed with cold ethanol, then with hot acetone, and dried. The dye thus obtained contains a small amount of sodium chloride but can be used without purification, to dye paper. Its aqueous solution has a strong spectral absorption at 432 millimicrons, and in methanol at 412 millimicrons. It dissolves in water to form a solution containing in excess of 2% by weight of dye.

Example 12

(A) To an agitated suspension of 37 parts of 4,4'-diamino-2,2'-stilbenedisulfonic acid in 124 parts of N,N-dimethylacetamide are added 9.7 parts of sodium methylate and 1.1 parts of sodium carbonate followed by 65 parts of water. A homogeneous solution results upon addition of the water. The solution is heated to distill off about 70 parts of water and methanol, providing a suspension of the disodium salt of the organic disulfonic acid in anhydrous form. To the cooled suspension are added 24.9 parts of ethyl cyanoacetate. The temperature of the reaction mass is raised to 160° C., and soon ethanol begins to distill off through fractionating equipment. The reaction is complete when distillation of ethanol ceases and a small amount of dimethylacetamide distills over (about 1 to 2 hours). Upon cooling the reaction mass, some of the product, 4,4'-bis(cyanoacetamido)-2,2'-stilbenedisulfonic acid, disodium salt, settles out. This product is filtered off, washed with 35 parts of ether, and dried. Addition of acetone to the original filtrate yields additional product of good quality.

The stilbene derivative thus obtained is substantive to cellulosic fibers.

(B) An agitated mixture consisting of 137 parts of the amido-stibene thus obtained, 460 parts (containing 192 parts of aldehyde ingredient) of the mixture of salt and p-[bis(2-sulfoethyl)amino]benzaldehyde, disodium salt of Example 3(B), 2500 parts of N,N-dimethylacetamide and 10 parts of a 10% aqueous solution of tetramethylammonium hydroxide catalyst is heated at refluxing temperature for three hours. The hot solution is filtered to remove sodium chloride and the filtrate is drowned in a 10-fold volume of acetone. The yellow-orange precipitate is filtered off and dried. The dye thus obtained has the formula:

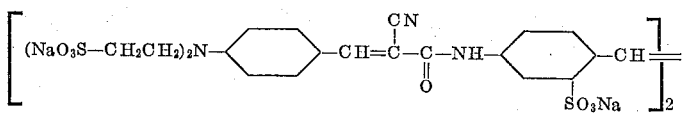

It is very water soluble, over 5% of dye by weight, and exhibits strong absorption maxima; at 422 millimicrons in water solution, and at 415 millimicrons in methanol.

Acidification of an aqueous solution of the above dye, using acetic or dilute hydrochloric acid, yields an attractive orange-red dye solution from which the acid form of the dye may be isolated by evaporating the solution to dryness. Either the salt or free acid form of the dye is used to color paper, the resulting dyeings being green-yellow or orange-red, respectively.

Example 13

(A) 478 parts of commercial quality (see Colour Index 13,920 and Schubert, Ann. 558, 10 (1947)) 2-(p-aminophenyl)-6-methyl-7-benzothiazolesulfonic acid, containing 33% water, are stirred with 54 parts of calcium hydroxide in 4000 parts of water. The resulting insoluble product is filtered off and dried to provide an excellent yield of the dihydrate of the calcium salt of the sulfonic acid starting material.

(B) 190 parts of the above calcium salt and 1000 parts of N,N-dimethylacetamide are heated at reflux temperature until about 19 parts of water distill off through a fractionating column. 60 parts of ethylcyanoacetate are added to the reaction mass at 140° C., and the temperature is gradually raised to 167° C. over a period of two hours while about 23 parts of ethanol distill off. The cooled mixture is drowned in 10,000 parts of isopropyl alcohol, and the brown solid is filtered off, washed with isopropyl alcohol and dried. The product thus obtained has the formula:

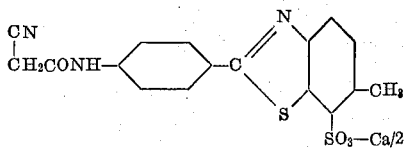

Analyses for the elements correspond closely to the values required by the above structure. An aqueous solution of this compound exhausts essentially quantitatively onto paper and exhibits a strong blue fluorescence.

(C) 406 parts of the 2-[p-(cyanoacetamido)phenyl]-6-methyl-7-benzothiazolesulfonic acid, calcium salt thus prepared, 276 parts of p-[ethyl(2-sulfoethyl)amino]benzaldehyde, calcium salt (prepared by treating a concentrated aqueous solution of the corresponding sodium salt, 1 mole, with 0.5 mole of calcium chloride, adding an equal volume of ethanol, filtering, and drying), 1000 parts of N,N-dimethylacetamide and 10 parts of piperidine are heated at reflux temperature for three hours. The cooled reaction mixture is drowned in 5000 parts of ether, and the yellow precipitate is filtered off, washed with hot acetone, and dried. The product obtained is the calcium salt of the sulfonic acid form of the dye formulated in Example 5(B).

The yellow dye thus obtained has moderate solubility in water from which solution it exhausts almost completely onto paper. An aqueous solution of the dye has a strong absorption at 439 millimicrons, and in methanol solution its absorption peak is located at 419 millimicrons.

*Example 14*

A mixture consisting of 352 parts of purified p-[methyl(4-sulfobutyl)amino]benzaldehyde, sodium salt (Example 4(B)), 328 parts of 6-cyanoacetamido-1-naphthol-3-sulfonic acid, sodium salt, 2000 parts of isopropyl alcohol and 10 parts of a 10% aqueous solution of tetramethylammonium hydroxide catalyst is heated at reflux temperature for 12 hours. The reaction mass is cooled in ice, and the precipitate is filtered off, washed with acetone and dried. The dye thus obtained has the structure:

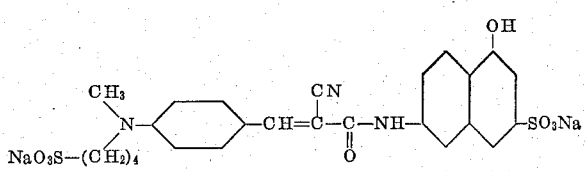

It is soluble in water to an extent greater than 2% by weight of the solution, and dyes paper an attractive greenish-yellow shade.

Absorption maxima in water and methanol solutions, for several dyes of the present invention, are shown in the following Table I. The dyes of Examples 15 to 20 are made from their sulfo-aldehyde and cyanoacetamido components by following the procedure described in Example 12(B).

R, M and "N-aryl" in the table refer to components of the dye whose structure is represented as follows:

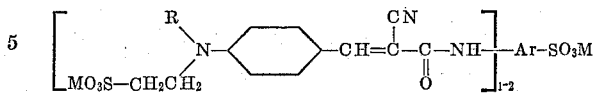

The key used in the table for the "N-aryl" component is as follows:

(I) 4,4'-diamino-2,2'-stilbenedisulfonic acid, M salt.
(II) 6-amino-1-naphthol-3-sulfonic acid, M salt.
(III) 7-amino-1-naphthol-3-sulfonic acid, M salt.
(IV) 2-(p-aminophenyl)-6-methyl-7-benzothiazolesulfonic acid, M salt.

TABLE I

| Ex. No. | R | M | N-aryl from— | Absorption maxima, millimicrons, measured in— | |
|---|---|---|---|---|---|
| | | | | Water | Methanol |
| 9(B) | $C_2H_5$ | Na | IV | 439 | 419 |
| 10 | $C_2H_5$ | Na | II | 430 | 406 |
| 11 | $C_2H_5$ | Na | III | 432 | 412 |
| 12(B) | $CH_2CH_2SO_3Na$ | Na | I | 422 | 415 |
| 15 | $CH_2CH_2SO_3H$ | H | I | 480 | 468 |
| 16 | $C_2H_5$ | Ca/2 | IV | 439 | 419 |
| 17 | $CH_3$ | Na | IV | 435 | 415 |
| 18 | $CH_2CH_2SO_3Na$ | Na | II | 418 | 390 |
| 19 | $C_2H_5$ | Na | I | 433 | 417 |
| 20 | $CH_2CH_2SO_3Na$ | Na | IV | 414 | 394 |

*Example 21.—Typical dyeing process and substantivity tests*

The following procedure is used to determine the substantivity of the novel dyes for cellulosic fibers such as paper.

0.025 part of the dye prepared in Example 9(B) is added to an aqueous slurry of 100 parts (dry basis) of pure defibered bleached sulfite cellulose pulp in 3000 parts of water. The mixture is beaten and agitated thoroughly for 15 minutes, then diluted with water to make a total of 12,000 parts. The pulp is pressed on a wire screen and sucked free of surface water, by procedures well known in the art of paper making. The pulp-free water obtained from this process is known as "white water." The pressed pulp is dried by heating, to provide paper sheet which is dyed a bright green-yellow shade that fluoresces greenish under ultraviolet light.

The "white water" is examined in a spectrophotometer to detect, and measure, any residual (unabsorbed) dye that may remain in solution. Substantivity of the dye to paper is inversely proportional to the amount of dye found in the "white water."

The amount of dye employed in the present example may be varied from approximately 0.001 to 1.0 part to provide lightly tinted to deeply colored dyeings. The percent by weight of paper pulp in the initial slurry may vary considerably, according to practice well known in the trade. Use of size and alum is optional and, if used, may vary from about 0.5 to 3 parts and from 1 to 4 parts, respectively.

Based on spectral data, as described above, I have determined the substantivities of several of my novel dyes. The values are shown in Table II which gives percent, amounts (by weight) of the dyes retained in the paper pulp without use of retention aids such as size and alum. Closely related dyes having zero retention are also shown in the table under examples identified as "Control."

R, M and "N-aryl" in Table II are defined as for Table I above, and are based on the same general structure as used for that table.

TABLE II

| Ex. No. | R | M | N-aryl from— | Percent Retained |
|---|---|---|---|---|
| 13(C) | C₂H₅ | Ca/2 | IV | 88 |
| 9(B) | C₂H₅ | Na | IV | 63 |
| Control | C₂H₅ | Na | Disulfonated dehydrothio-p-toluidine, sodium salt. | 0 |
| 10 | C₂H₅ | Na | II | 25 |
| Control | C₂H₅ | Na | 6-amino-2-naphthalenesulfonic acid, sodium salt. | 0 |
| 11(B) | C₂H₅ | Na | III | 23 |
| Control | C₂H₅ | Na | 6-amino-2-(and 3)-naphthalenesulfonic acid sodium salt. | 0 |
| 17 | CH₃ | Na | IV | 51 |
| Control | CH₃ | Na | Disulfonated dehydrothio-p-toluidine, sodium salt. | 0 |
| 8(C) | CH₂CH₂SO₃Na | Na | II | 14 |
| Control | CH₂CH₂SO₃Na | Na | Sulfanilic acid, sodium salt | 0 |
| 20 | CH₂CH₂SO₃Na | Na | IV | 33 |
| Control | CH₂CH₂SO₃Na | Na | Disulfonated dehydrothio-p-toluidine, sodium salt. | 0 |
| 19 | C₂H₅ | Na | I | 12 |
| Control | C₂H₅ | Na | 2-amino-1-phenol-4-sulfonic acid sodium salt. | 0 |

In an alternate procedure for dyeing paper, the condensation product of above mentioned type BC (from an alkyl cyanoacetate and a selected aminoarylsulfonic acid) is applied to pulp in the paper beater. The reaction between this dye intermediate and the sulfo-aldehyde is then performed on the paper sheet. To accomplish this, a solution of the sulfo-aldehyde and basic catalyst is applied to the sheet which contains the cyanoacetamido compound, and the sheet is then heated as the paper is dried over a drum drier.

The aldehydes found to be useful in the present invention include those represented by the general formula:

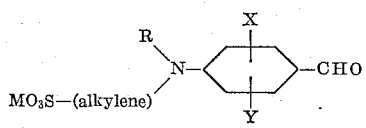

wherein R represents a radical selected from the group consisting of alkyl, benzyl, phenethyl, 2-hydroxyethyl, 2-cyanoethyl, 2-chloroethyl, 2-bromoethyl, alkoxymethyl, 2-alkoxyethyl, 2-(2-hydroxyethoxy)ethyl and -(alkylene)-SO₃M; X and Y may be alike or different and are selected from the group of radicals consisting of hydrogen, alkyl, alkoxy, fluorine, chlorine and bromine; M is hydrogen, an alkali metal such as lithium, sodium or potassium, or an alkaline earth metal such as calcium, magnesium or barium; alkylene is a straight or branched aliphatic hydrocarbon chain containing 2 to 4 carbon atoms on which the sulfo group is located at a carbon atom numbered 2 to 4, and wherein all the alkyl and alkoxy radicals have from 1 to 4 carbon atoms.

Specific aldehydes, and salts thereof, of the preceding general types which may be used in this invention are the following:

p-[Methyl(2-sulfoethyl)amino]benzaldehyde
p-[Butyl(2-sulfoethyl)amino]benzaldehyde
p-[Sec-butyl(2-sulfoethyl)amino]benzaldehyde
p-[Benzyl(2-sulfoethyl)amino]benzaldehyde
p-[Phenethyl(2-sulfoethyl)amino]benzaldehyde
p-[Isobutyl(3-sulfopropyl)amino]benzaldehyde
p-[Tert-butyl(4-sulfobutyl)amino]benzaldehyde
p-[Isoproply(2-sulfopropyl)amino]benzaldehyde
p-[Ethyl(3-sulfobutyl)amino]benzaldehyde
p-[(2-hydroxyethyl)(2-sulfoethyl)amino]benzaldehyde
p-[(2-chloroethyl)(2-sulfoethyl)amino]benzaldehyde
p-[(2-cyanoethyl)(2-sulfoethyl)amino]benzaldehyde
p-[(Ethoxymethyl)(2-sulfopropyl)amino]benzaldehyde
p-[(2-methoxyethyl)(2-sulfopropyl)amino]benzaldehyde
p-[(2-[2-hydroxyethoxy]ethyl)(2-sulfoethyl)amino]benzaldehyde
p-[Propyl(2-sulfoethyl)amino]benzaldehyde
4-[methyl(3-sulfopropyl)amino]o-tolualdehyde
5-chloro-4-[ethyl(2-sulfoethyl)amino]-o-tolualdehyde
4-[methyl(2-sulfoethyl)amino]-o-anisaldehyde
3-butoxy-4-[methyl(2-sulfoethyl)amino]benzaldehyde
2-bromo-4-[(2-bromoethyl)(4-sulfobutyl)amino]-5-chlorobenzaldehyde
2,6-dichloro-4-[methyl(3-sulfopropyl)amino]benzaldehyde
2-bromo-6-ethoxy-4-[ethyl(4-sulfobutyl)amino]benzaldehyde
4-[bis(2-sulfoethyl)amino]-o-tolualdehyde
p-[Ethyl(1-methyl-2-sulfopropyl)amino]benzaldehyde
4-[bis(4-sulfobutyl)amino]-2-fluoro-6-isobutyl-benzaldehyde
4-[bis(2-sulfopropyl)amino]-2,5-dimethylbenzaldehyde
4-[bis(2-sulfoethyl)amino]-2,5-dimethoxybenzaldehyde.

These aldehydes are prepared by treating the corresponding chloro or bromo alkyl compounds with an alkali metal sulfite according to the procedures described in the examples. When R in the above aldehyde general structure represents a 2-chloroethyl or 2-bromoethyl radical, the Cl and Br atoms of said radicals are introduced, after the sulfiting step, into the corresponding 2-hydroxyethyl compound. The latter is made by cleaving an ether or ester group on the intermediate. With the exception mentioned, the replacement sulfonation reaction may take place at any stage of the synthesis, e.g. on: (a) the halogenoalkylamine aldehyde, (b) the condensation product of the aldehyde and alkyl cyanoacetate (type AB) or (c) the halogenoalkyl intermediate for the dye (type ABC).

The selection of operative solvents for the methine dye condensation reaction is not particularly critical. Disclosed in the representative examples are ethanol, isopropyl alcohol and N,N-dimethylacetamide. Alcoholic solvents are preferred because of their convenience (boiling point), availability and low cost. The ether-alcohol solvents such as the monomethyl (or ethyl) ether of ethylene glycol or diethylene glycol may also be employed. Other operable solvents include N,N-dimethylformamide, N,N-diethylacetamide, dimethylsulfoxide, pyridine and the like. Mixtures of these solvents, with or without considerable amounts of water, or water alone, may also be used.

Operable catalysts which may be utilized include the following strong bases: morpholine, piperidine, sodium methylate, tetramethylammonium hydroxide, 20% aqueous potassium hydroxide or sodium hydroxide and the like.

M in the preceding general formulas represents hydrogen, an alkali metal, an alkaline earth metal, or ammonium. The Na and Ca salts are preferred, and are used by way of illustration in the examples. Preparation of the various salt forms, also isolation of the free acid, SO₃H, form of the intermediates and dyes and conversion of these to the various salt forms are illustrated by the following alternate routes: (1) The four aminoarylsulfonic acid compounds I to IV (see Table I), as free acid are employed in the reaction with ethyl cyanoacetate in the presence of an alkali, an alkaline earth and/or an alkali alcoholate as described in the above examples. The alkali or alkaline earth salt is the reactive form. Suitable alkaline or alkaline earth compounds for use in this reaction are: the hydroxides, carbonates or bicarbonates of lithium, sodium, calcium, magnesium, potassium or barium. Suitable alkali alcoholates are: sodium, lithium or potassium methylate, ethylate and the like. The resulting alkali or alkaline earth metal salts of the cyanoacetamido-arylsulfonic acids are condensed with various aldehydes, by processes described in the above examples, to provide the respective alkali or alkaline earth metal salts of the final methine dyes. (2) The cyanoacetamido-arylsulfonic acids, sodium salts, also employed as starting materials in above examples, are treated with aqueous hydrochloric or sulfuric acid, filtered off and dried. The free acids thus obtained, are agitated with aqueous ammonium hydroxide, and dried, to provide the ammonium salts of the cyanoacetamido-arylsulfonic acids. (3) The free acid form of the amidosulfonic acids may also be employed in the processes of the above examples to provide the final dyes in the form of their free acids. When the final dyes are isolated as the organic base salts of the sulfonic acids, in view of the base catalysts employed or because of the presence of dialkyl amines that are formed by partial hydrolysis of amide solvents, these dye salts are converted, if desired, to the free acids by treatment with dilute mineral acid. The free acid form of the dyes may be isolated by filtering and drying or by evaporating the acidified solution to dryness. (4) The free acid form of the methine dyes is converted to the alkali, alkaline earth or ammonium salt form by treatment of the free acids in aqueous solution with an alkaline compound selected from those mentioned above. In an alternate method, the less soluble alkaline earth salts of the sulfo dyes and sulfo dye intermediates are prepared by adding a water-soluble alkaline earth metal salt, or aqueous solution thereof, to an aqueous solution of the more soluble alkali metal or ammonium salts of the sulfo dyes and sulfo dye intermediates. The various salt forms thus obtained are isolated by drying, filtration or by salting and filtering, depending on their solubility requirements.

The preceding representative examples may be varied within the scope of the present total specification disclosure as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

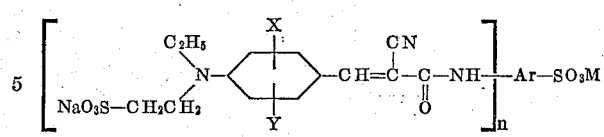

wherein Ar—SO₃M is a radical selected from the group consisting of (a)

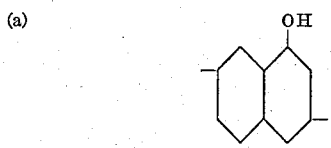

(b)

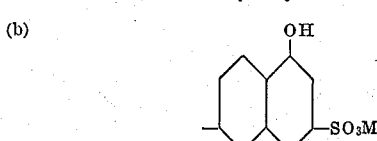

(c)

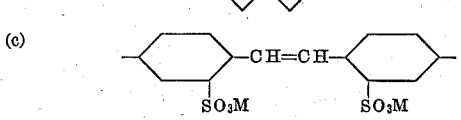

and (d)

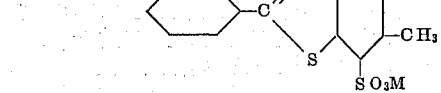

$n$ is an integer from 1 to 2 as required by the valence of said radicals (a) to (d); R is a radical selected from the group consisting of alkyl, benzyl, phenethyl, 2-hydroxyethyl, 2-cyanoethyl, 2-chloroethyl, 2-bromoethyl, alkoxymethyl, 2-alkoxyethyl, 2-(2-hydroxyethoxy)ethyl and -(alkylene)-SO₃M; X and Y are selected from the group of radicals consisting of hydrogen, alkyl, alkoxy, fluorine, chlorine and bromine, alkylene is a straight or branched aliphatic hydrocarbon chain containing 2 to 4 carbon atoms on which the sulfo group is located at a carbon atom numbered 2 to 4, and wherein said alkyl and alkoxy radicals have from 1 to 4 carbon atoms, and M is selected from the group consisting of hydrogen, an alkali metal, an alkaline earth metal and the ammonium radical.

2. A compound of the formula

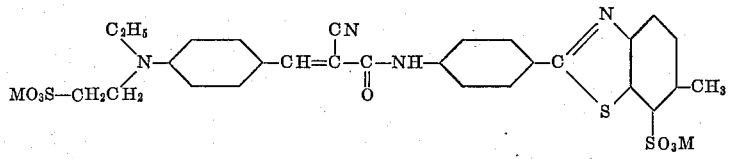

wherein M is selected from the group consisting of hydrogen, an alkali metal, an alkaline earth metal and the ammonium radical.

3. The compound of claim 2 wherein M is sodium.

4. The compound

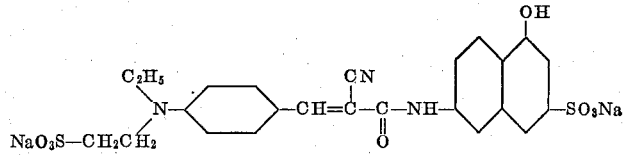

5. The compound

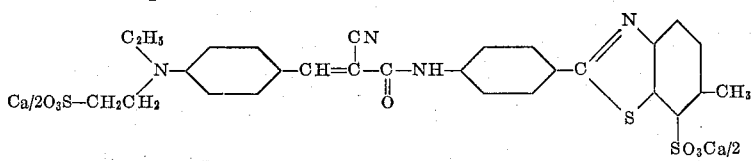

6. The compound

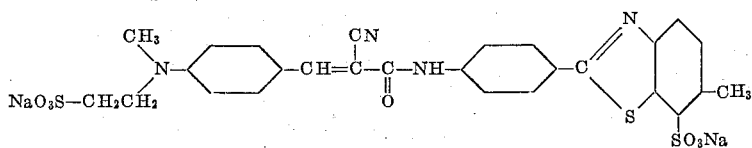

7. The compound

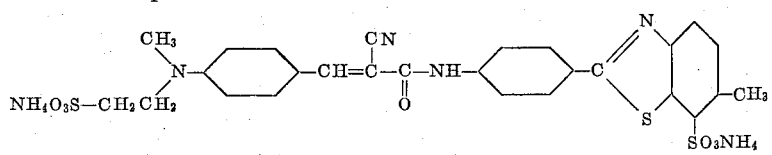

References Cited by the Examiner

UNITED STATES PATENTS

| | | | |
|---|---|---|---|
| 1,950,421 | 3/1934 | Wahl | 260—240.9 |
| 2,043,081 | 6/1936 | Wahl | 260—240.9 |
| 2,688,541 | 9/1954 | Ganguin et al. | 260—240.9 |
| 3,018,287 | 1/1962 | Fleck | 260—240 |
| 3,066,005 | 11/1962 | Wedemeyer et al. | 8—54.2 |
| 3,072,650 | 1/1963 | Semb et al. | 260—240 |
| 3,082,052 | 3/1963 | Booth et al. | 8—54.2 |

OTHER REFERENCES

Lubs: Chemistry of Synthetic Dyes and Pigments (New York (1955) pages 88–91 and 67 to 671 added).

Lubs: Chemistry of Synthetic Dyes and Pigments (New York, 1955) pages 248–54.

WALTER A. MODANCE, *Primary Examiner.*

NICHOLAS S. RIZZO, JOHN D. RANDOLPH,
*Examiners.*

A. D. ROLLINS, *Assistant Examiner.*

UNITED STATES PATENT OFFICE
CERTIFICATE OF CORRECTION

Patent No. 3,257,393                            June 21, 1966

William Howells Vinton

It is hereby certified that error appears in the above numbered patent requiring correction and that the said Letters Patent should read as corrected below.

Column 14, lines 2 to 7, for the left-hand portion of the formula reading

Signed and sealed this 1st day of August 1967.

(SEAL)
Attest:

EDWARD M. FLETCHER, JR.                      EDWARD J. BRENNER
Attesting Officer                             Commissioner of Patents